United States Patent
Healey

(10) Patent No.: US 6,652,331 B2
(45) Date of Patent: Nov. 25, 2003

(54) TROLLING MOTOR WITH INTEGRAL SONAR TRANSDUCER

(75) Inventor: Robert W. Healey, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 16 days.

(21) Appl. No.: 09/900,756

(22) Filed: Jul. 7, 2001

(65) Prior Publication Data

US 2002/0013106 A1 Jan. 31, 2002

Related U.S. Application Data

(60) Provisional application No. 60/218,850, filed on Jul. 13, 2000.

(51) Int. Cl.[7] ............................................... B63L 11/02
(52) U.S. Cl. ....................... 440/6; 114/144 E; 367/131; 367/141; 367/173
(58) Field of Search ........................... 440/1, 6, 7, 900; 114/144 E, 144 RE; 181/140; 367/87, 88, 131, 141, 165, 173, 174, 188, 910; 174/27, 32, 35 R, 102 R, 104, 105 R, 106 R, 107, 113 R, 115, 36

(56) References Cited

U.S. PATENT DOCUMENTS

| | | | | |
|---|---|---|---|---|
| 4,376,920 A | * | 3/1983 | Smith | 333/12 |
| 4,383,225 A | * | 5/1983 | Mayer | 333/12 |
| 4,641,110 A | * | 2/1987 | Smith | 333/12 |
| 4,995,010 A | * | 2/1991 | Knight | 367/111 |
| 5,069,642 A | * | 12/1991 | Henderson | 440/6 |
| 5,088,943 A | | 2/1992 | Henderson | |
| 5,108,322 A | | 4/1992 | Henderson | |
| 5,112,258 A | | 5/1992 | Folsom | |
| 5,129,845 A | | 7/1992 | Henderson | |
| 5,171,173 A | | 12/1992 | Henderson et al. | |
| 5,329,064 A | * | 7/1994 | Tash et al. | 174/36 |
| 5,525,081 A | | 6/1996 | Mardesich et al. | |
| 6,247,980 B1 | | 6/2001 | Moore et al. | |

* cited by examiner

Primary Examiner—S. Joseph Morano
Assistant Examiner—Ajay Vasudeva
(74) Attorney, Agent, or Firm—Fellers, Snider, Blankenship, Bailey & Tippens, P.C.

(57) ABSTRACT

A trolling motor having an integral sonar transducer including: a submerged motor housing; an electric motor housed in the housing; a sonar transducer housed in the housing; a motor controller having a pulse width modulated output and a shielded electrical cable connecting the sonar transducer to a sonar device. Noise from all sources (i.e., electrical noise from ground loops, radio frequency interference, and magnetic interference) is suppressed in the output signal of the transducer through a number of techniques. The electrical cable includes an outer shield connected to the chassis ground of the trolling motor; an inner shield connected to the circuit ground of the sonar device; and a pair of signal carrying conductors comprising a twisted pair. In addition, the resonant frequency of the transducer is selected such that it is not a harmonic of the operating frequency of the pulse width modulated output of the motor controller.

4 Claims, 6 Drawing Sheets

TROLLING MOTOR WITH INTEGRAL SONAR TRANSDUCER

CROSS REFERENCE TO RELATED APPLICATION

This application claims priority from copending U.S. provisional patent application Ser. No. 60/218,850, filed Jul. 13, 2000, the disclosure of which is incorporated herein by reference.

BACKGROUND OF THE INVENTION

1. Field of the Invention

This invention relates generally to a trolling motor for a fishing boat. More particularly, but not by way of limitation, the present invention relates to a trolling motor for a fishing boat with an integral sonar transducer for use with a fish locator, depth finder, or the like.

2. Background

Trolling motors are well known in the art as are sonar devices. Generally speaking, a trolling motor is a small electric motor coupled to a propeller for quietly adjusting the position of a fishing boat at relatively low speeds. Trolling motors are available with a variety of features such as variable speed, electric steering, power mounts, etc. Some models connect to a sonar device such as a depth finder to provide the user with navigational options, for example following a straight-ahead course, following a bottom contour, etc.

Sonar devices are also popular equipment for the sport fisherman. Typically, a sonar transducer is placed in the water facing generally downward. A control unit, preferably mounted within view of the fisherman, causes the transducer to emit a pulse of acoustical ultrasonic energy. Upon completion of the pulse, the control unit uses the transducer to "listen" for return echos. By measuring the time period to a particular echo, the control unit can determine the distance between the transducer and an object. By measuring the amplitude of the echo, the control unit may predict the size of the object. Many contemporary control units employ complex computer software and additional sensors to provide information to the fisherman regarding a host of underwater factors and navigational information.

In a conventional installation, an on-board sonar device utilizes a transducer that has been mounted to the hull of the boat. This sort of mounting arrangement, however, is not without its problems. For example, if the transducer is attached to the boat with screws, the screws must necessarily penetrate the outer surface of the hull at a point that may be at least occasionally beneath the water line. Obviously, this can lead to leaks and associated problems. Alternatively, if the transducer is adhesively mounted, the adhesive must be capable of continuous contact with water without becoming compromised. Mounting a transducer to a bracket which is attached to the boat above the waterline can mitigate these concerns to a certain extent, but that solution is not always available.

Since a trolling motor must also be mounted to the boat and since the motor and propeller must be submerged, it would thus appear, at least at first blush, that a trolling motor would provide an ideal platform for placement of an ultrasonic transducer. The prospect of placing a sonar transducer in a trolling motor is even more appealing in light of the fact that, at least with high-end equipment, an ever increasing number of trolling motor features are being coupled to display devices such as sonar control units so that an operator may be provided a visual indication of operating parameters and conditions. Placing a sonar transducer in a trolling motor also simplifies cable routing since the sonar cable may easily be routed through the trolling motor support column.

Unfortunately, prior attempts to locate a sonar transducer in a trolling motor have been hindered by the amount of electrical and electromagnetic noise present in the general vicinity of the trolling motor. Trolling motors generate such noise in at least four areas.

First, by the very nature of the control system that is typically used in combination with a trolling motor. Electronic control of trolling motors and electronic steering systems have almost universally employed pulse width modulation (PWM) schemes, as opposed to linear drive circuitry. PWM control systems operate more efficiently than linear systems which result in components that operate at a substantially lower temperature, utilize less power, and need less complex drive circuitry. However, the general nature of a PWM control system requires production of a substantially rectangular waveform at the output of the driver. Such a waveform inherently contains substantial harmonic content many times over the fundamental frequency of the PWM signal. When a PWM signal is used to drive the motor, the electrical currents are relatively high, thus generating nontrivial amounts of high frequency electrical and electromagnetic noise. If this signal has harmonic content approximately equal to the frequency of the signal produced by the sonar transducer, the received transducer signal may be completely obscured by the noise thus produced. Further, if the transducer cable and the power supply cable for the motor both run through the support column, the opportunity for cross talk from the power cable to the transducer cable is greatly enhanced. Of course, such cross talk poses still another opportunity for the motor drive signal to find its way into the received sonar signal.

Second, noise generally referred to as "brush noise" is created by the motor. As the armature rotates in the motor, the brushes ride on the commutator, cyclically energizing the windings located on the armature. As a particular winding is de-energized during this process, arcing is likely to occur between the brush and the contact on the commutator resulting in electric and electromagnetic noise.

Third, substantial amounts of noise may also be introduced into the received sonar signal through common circuit conductors. Commonly known as ground loops, unwanted electrical currents often flow through conductors when multiple electrical paths are created through the interconnection of multiple circuit elements, e.g., the trolling motor and the sonar control unit. For example, the control unit may be connected to the boat's electrical system, the negative lead of which is normally connected to chassis ground. The trolling motor may be connected instead to a spare battery located in the boat. The negative power supply lead from the spare battery may also be connected to trolling motor chassis components. Once the trolling motor is mounted to the boat, or when placed in the water, an electrical connection is made between the boat electrical system and the trolling motor electrical system. In this case, no currents will flow because there is a single common connection. On the other hand, if, for example, a shield within a signal cable is then connected between the trolling motor and the control unit, unwanted electrical current will likely flow when either an accessories attached on the boat is powered, or when the trolling motor is operational. The resistance of the conductors causes voltage losses when such currents flow which appear as noise to the receiver circuitry. The reactive characteristics of the conductors will likewise induce noise from these currents.

Finally, the spinning armature in the motor produces an external magnetic field which varies over time at a frequency proportional to the rate of rotation of the motor. This varying magnetic field will induce a voltage in nearby conductors. The wires connected to a sonar transducer mounted in a trolling motor will necessarily be subjected to such a magnetic field which will result in additional unwanted noise in the received sonar signal.

The ability of an electronic device to resolve meaningful information from a received signal is determined, in part, by the signal to noise ratio (often given in dB) present at a receiver. Thus, as is well known to those skilled in the art, placing the sonar transducer near the trolling motor will cause the introduction of a substantial degree of noise into the receiver both from noise resulting from the motor drive and possibly from ground loops, thereby reducing the circuit's ability to resolve meaningful information from a received pulse.

Trolling motor models are available which include an integral sonar transducer. However, these trolling motors and the integral sensor only operate with a specific control unit which is properly configured for such operation. These systems are designed such that electrical noise that is created by the drive circuitry for the trolling motor and noise induced from ground loops will appear as common mode noise relative to the transducer output and may be subtracted out of the sonar signal by the receiver circuitry. The circuitry incorporated into the vast majority of trolling motors which are currently available does not allow for this sort of solution. An example of such a combination is disclosed in U.S. Pat. No. 5,525,081 issued to Mardesich, et al. which is hereby incorporated by reference.

It is thus an object of the present invention to provide a trolling motor with integral sonar transducer which will operate with an existing sonar control unit. It is also a related object of the present invention to provide a trolling motor with integral sonar transducer wherein there is substantial improvement in the signal to noise ratio of the signal presented to the sonar receiver from the transducer so incorporated into the trolling motor.

It is a further object of the present invention to provide a cable for connection between a sonar transducer and a sonar control unit which provides improved shielding from sources of high frequency noise in close proximity to the cable.

It is yet another object of the present invention to provide a method for electrically connecting a trolling motor with integral sonar transducer to a power source and to a sonar control unit so as to eliminate multiple ground paths on the sonar signal or reduce the effect thereof.

SUMMARY OF THE INVENTION

The present invention provides a trolling motor for a fishing boat with an integral sonar transducer for connection to a sonar control unit. In one embodiment of the present invention, an inventive cable for connecting the sonar transducer to a control head provides improved shielding from unwanted noise emanating from nearby sources.

In yet another embodiment of the present invention, there is provided a method for connecting the trolling motor to an electrical system and the sonar control unit to the transducer which will avoid the creation of ground loops.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Figure 1:
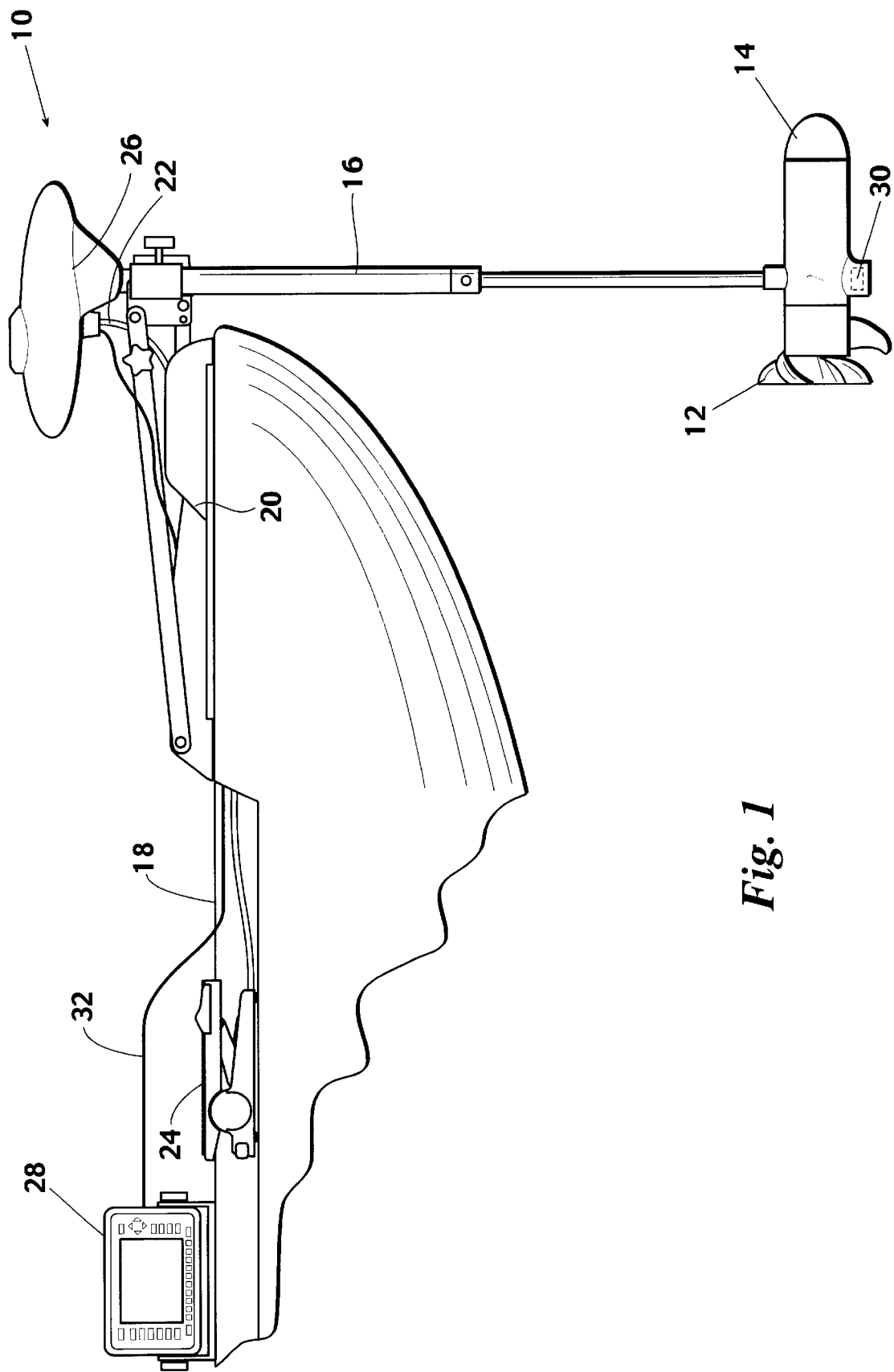
FIG. 1 shows the inventive trolling motor with integral sonar transducer in its general environment.

A preferred embodiment of the inventive trolling motor with integral sonar transducer 10 is shown in its general environment in FIG. 1. Typically, trolling motor 10 is removably attached to a fishing boat 18. To fully utilize the inventive aspects of trolling motor 10, boat 18 is most preferably equipped with sonar control unit 28. In operation, trolling motor 10 is preferably controlled by foot pedal 24 connected to trolling motor 10 by control cable 22. Sonar transducer 30 incorporated in trolling motor 10 is connected to sonar control unit 28 with cable 32.

Figure 2:
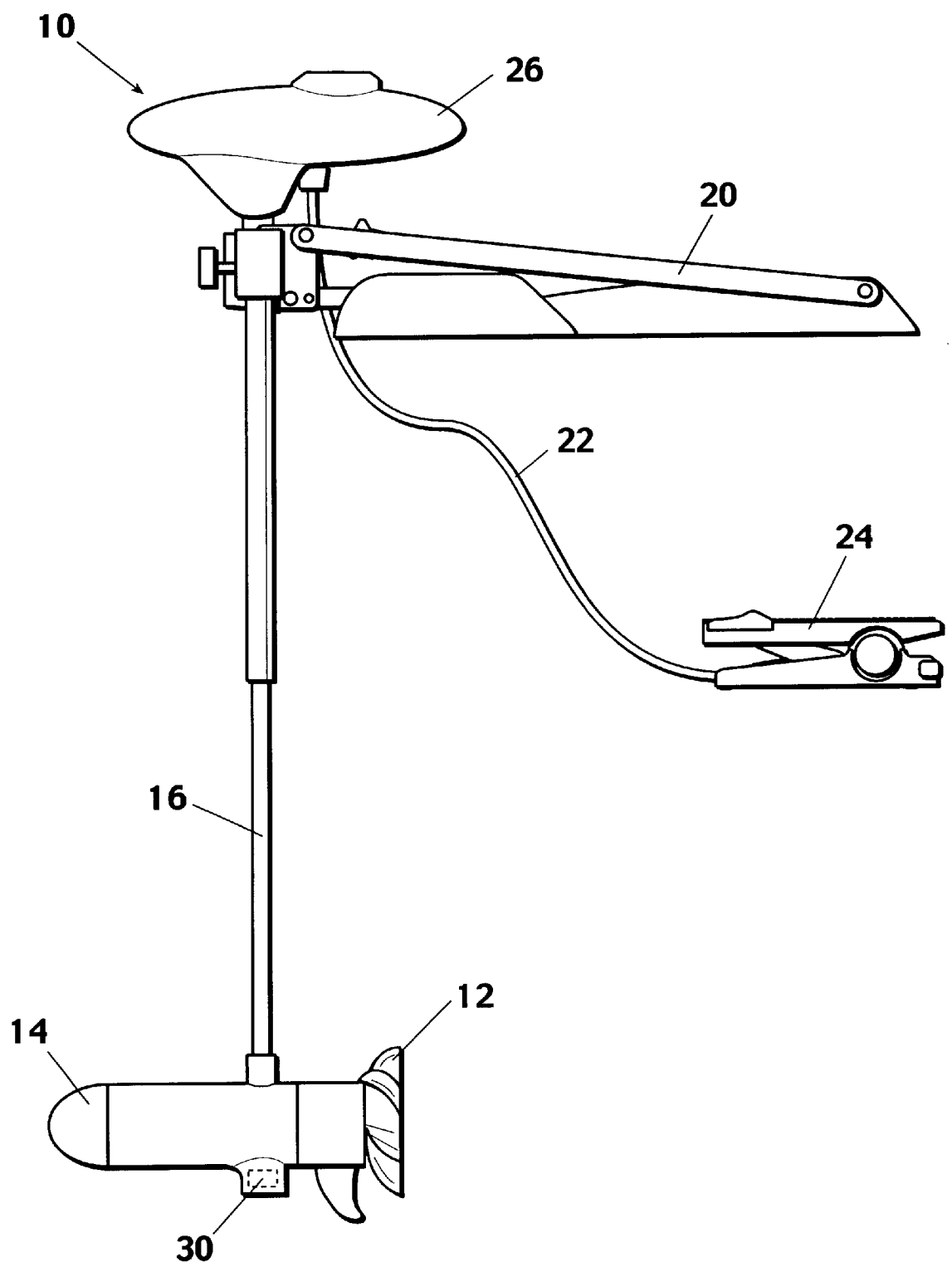
FIG. 2 provides a side view of the inventive trolling motor with integral sonar transducer.
Figure 3:
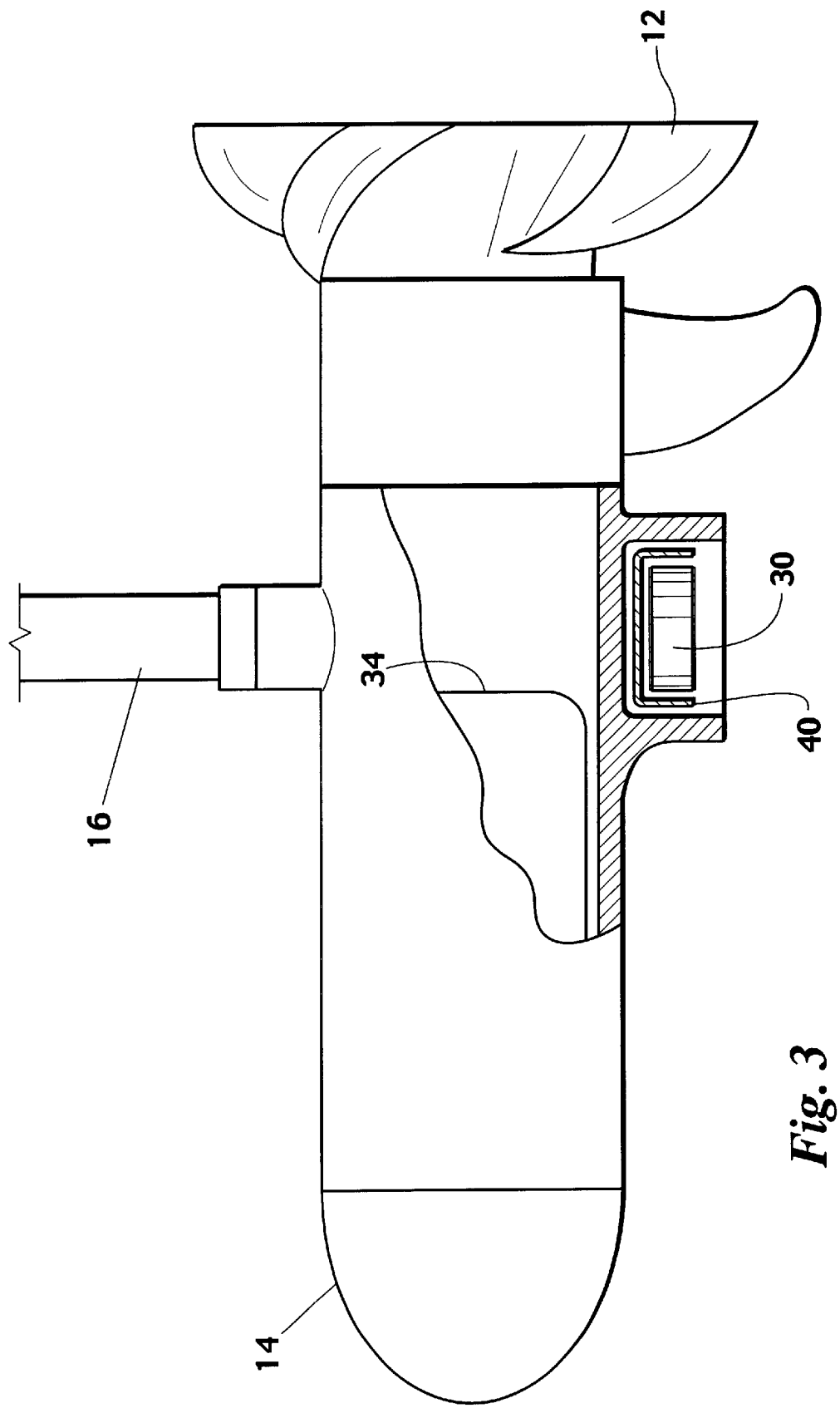
FIG. 3 provides a cutaway side view of the inventive trolling motor with integral sonar transducer.
Figure 5:
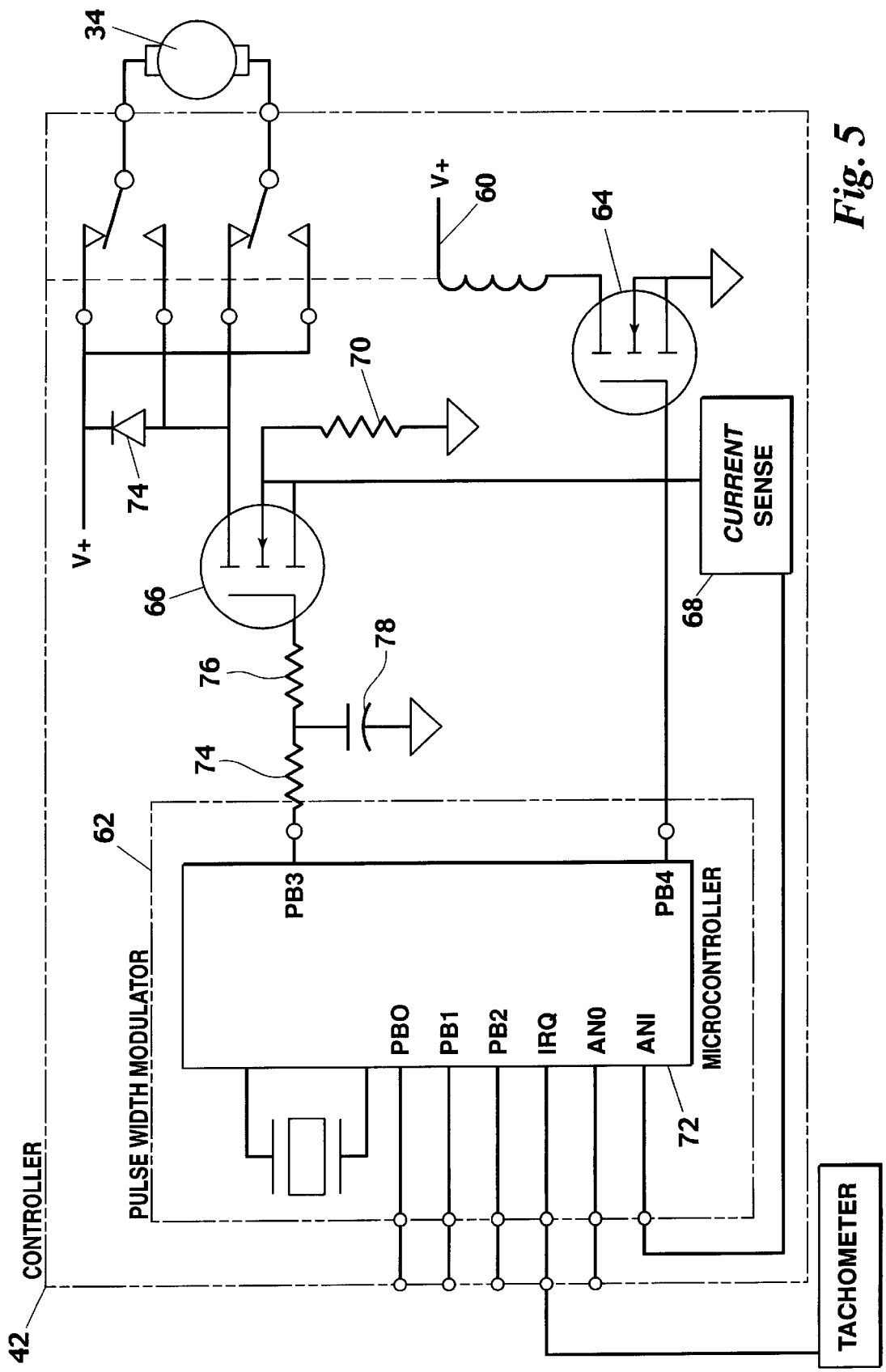
FIG. 5 provides a block diagram of a typical controller for a trolling motor which provides pulse width modulated drive signals.

Referring next to FIGS. 2 and 3, trolling motor 10 preferably comprises: motor housing 14 containing motor 34 which is drivingly coupled to propeller 12; support column 16 supporting motor housing 14 from mounting bracket 20; control head 26 mounted to the upper end of support column 16 housing motor controller 42 (FIG. 5); and cables 22 and 32 (FIG. 1) passing through support column 16 thereby reducing exposure to water.

Sonar transducer 30 is mounted to trolling motor 10 with shield 40 to protect transducer 30 from electromagnetic fields produced by motor 34. Cable 32 preferably contains a pair of twisted conductors 44a and 44b (FIGS. 4 and 6) which connect transducer 30 to sonar control unit 28.

Figure 4:
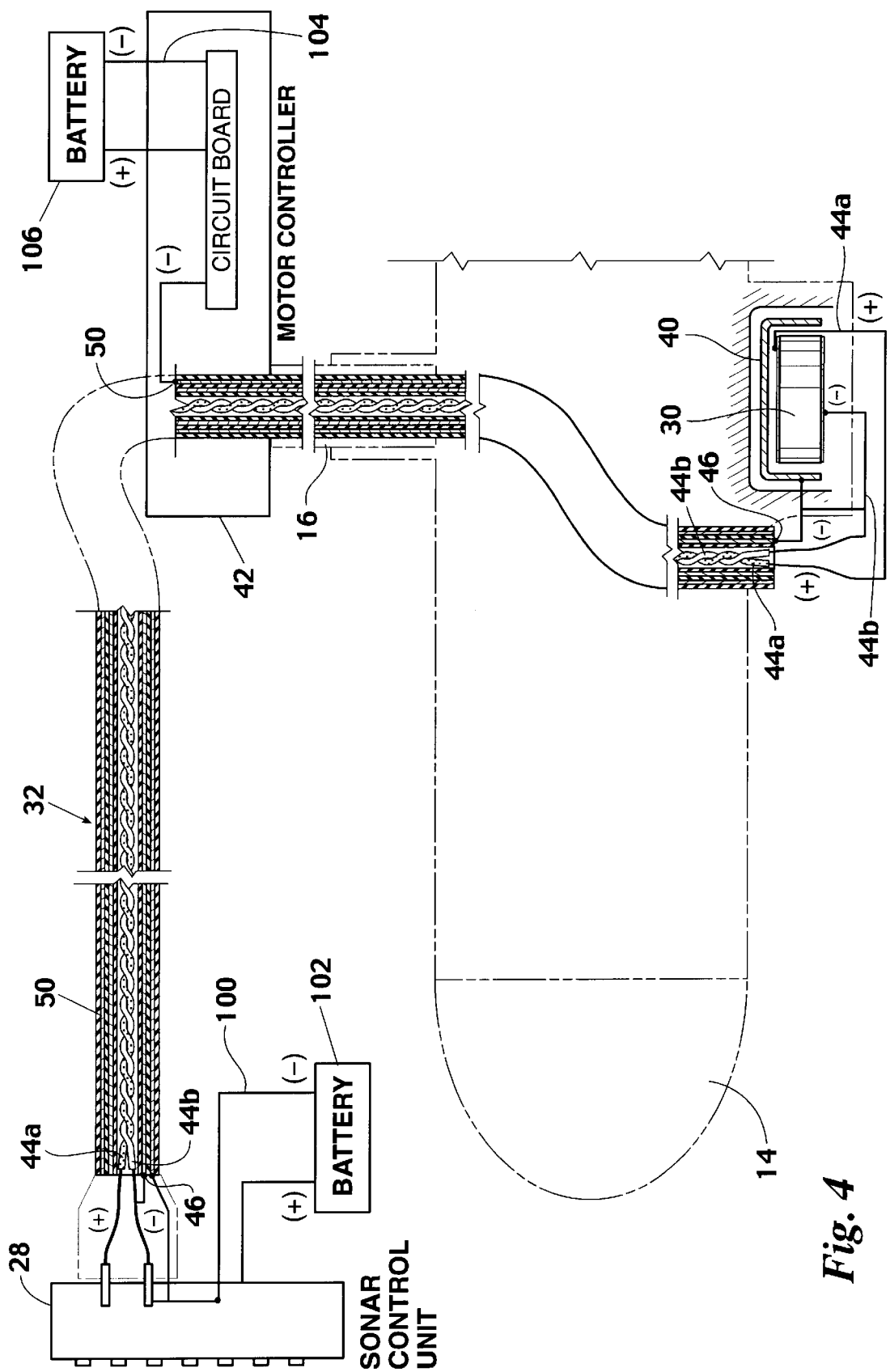
FIG. 4 provides a representative wiring diagram for connection of the inventive trolling motor to a power supply and for connecting the integral sonar transducer to a sonar control unit.
Figure 6:
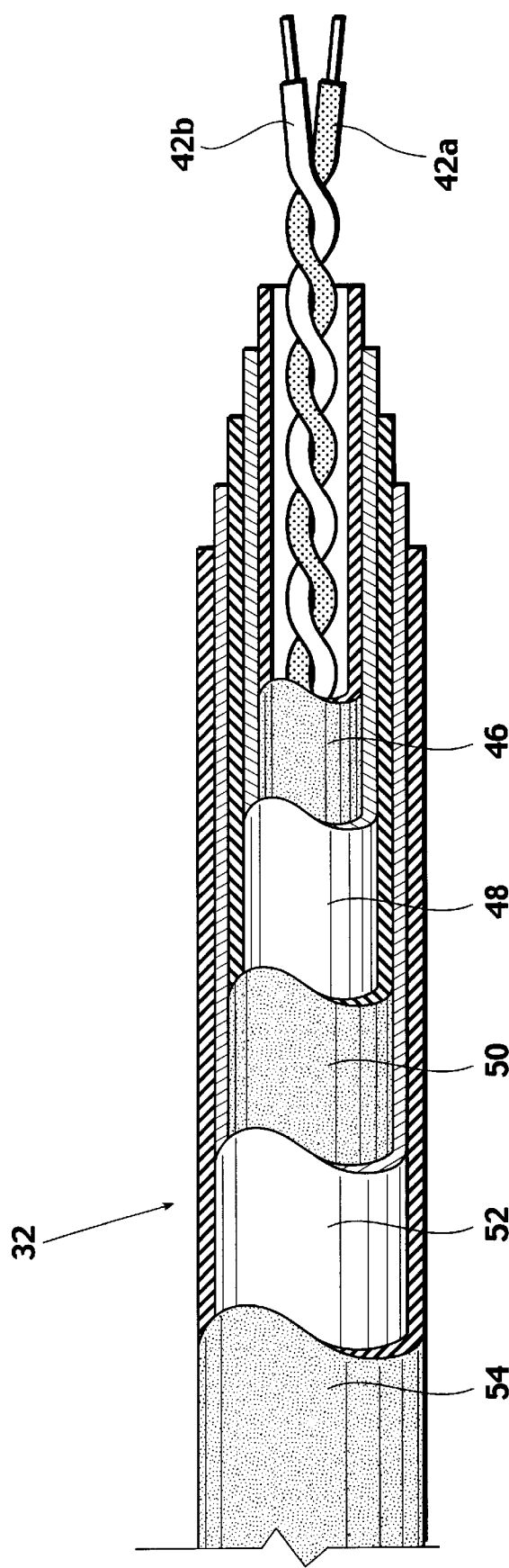
FIG. 6 provides a detail view of a stripped end of a sonar transducer cable incorporated in the inventive trolling motor with integral sonar transducer.

Referring next to FIG. 6, wherein is shown the construction of cable 32, conductors 44a and 44b are housed within an inner dielectric jacket 46. Inner jacket 46 is next surrounded by in inner shield 48. Preferably, inner shield 48 is a metal foil, however, it will be apparent to one skilled in the art that braided shield may also perform satisfactorily with the present invention. Shield 48 is then surrounded by an intermediate dielectric jacket 50 which is next wrapped in outer shield 52. Preferably, outer shield 52 is likewise metal foil, however once again, braided shield may also perform with acceptable results. Finally, outer jacket 54 surrounds and protects outer shield 52. It should be noted that shielded cable with twisted pair signal conductors is known in the art. However, unlike prior art cable used with sonar devices, the inventive cable provides a second layer of shielding 52 separated from inner shield 48 by tubular dielectric 50. As shown in FIG. 4 and discussed further hereinbelow, inner shield 48, as incorporated in the inventive trolling motor, is referenced to circuit ground 100 (FIG. 4) of sonar control unit 28 while outer shield 52 is referenced to the negative lead 104 of trolling motor power supply 106.

A cable constructed in accordance with the present invention will reduce the effects of nearby motor-produced magnetic fields on the received sonar signal. As is known in the art, a varying magnetic field will induce a voltage in nearby conductors. In the inventive cable however, outer shield 50 shields the inner conductors from such magnetic fields. Since outer shield 50 is preferably connected at only one point, voltages induced in outer shield 50 will not result in any unwanted electrical currents and will not affect the received sonar signal. In addition, the effects of any magnetic field which does in fact reach conductors 44a and 44b will be minimized by the twisting of conductors 44a and 44b in cable 32. In a similar manner, the outer shield 50 will shield signal carrying conductors 44a and 44b from the effects of electrical noise (i.e., radio frequency interference, crosstalk from adjacent conductors, and the like), of particular importance is protection from the noise produced in driving the motor with a pulse width modulated signal. Again, the twisting of conductors 44a and 44b will also reduce the effects of such noise.

Referring to FIG. 6, a motor controller 42 for use with the inventive trolling motor 10 would typically include pulse width modulator 62, reversing relay 60 energized by relay driver 64, motor driver 66 protected by freewheeling diode 74, and current sense circuitry 68 which conditions the output of current sense resistor 70. Preferably, pulse width modulator 62 is implemented using a microcontroller 72. However, it will be apparent to those skilled in the art that pulse width modulation may be accomplished by any one of a variety of known methods for performing such modulation. In operation, the controller receives a speed command from an user operated input device, preferably a foot pedal 24. The controller then calculates a duty cycle corresponding to the commanded motor speed and provides motor driver 66 with the appropriate waveform.

As previously discussed, the waveform produced by a PWM controller is typically rectangular in nature and thus a substantial amount of energy is produced at harmonic frequencies of the PWM waveform. An RC network comprising resistors 74 and 76, and capacitor 78 provides low pass filtering of the waveform driving motor driver 66. This filtering tends to somewhat "round" the waveform driving the motor and thus reduces the harmonic content of the signal so produced. As will be apparent to one skilled in the art, this increases the switching time of driver 66 thereby increasing the power dissipated in driver 66. Hence it can be seen that a tradeoff exists between the efficiency of the motor driver and reduced high frequency noise produced by the driver. For example, it was discovered that selecting a value of ten ohms for resistor 74, a value of fifteen ohms for resistor 76, and a value of 0.01 microfarads for capacitor 78 produced a noticeable reduction in harmonic noise with a minimal increase in the power dissipated in driver 66.

Generally speaking, a sonar transducer of the type incorporated in the present invention will preferably have a resonant frequency which coincides with the frequency at which the transducer is intended to operate. In the preferred embodiment, sonar transducer 30 is intended to operate at approximately 200 kilohertz. It will be apparent to one skilled in the art that such transducers are available for operation at a number of different frequencies and the selection of a particular frequency is not critical for operation of the present invention.

According to a preferred aspect of the instant embodiment, the frequency of the pulse width modulator 62 is selected such that the resonant frequency of the transducer 30 is not an exact harmonic of the pulse width modulation frequency, thereby minimizing or preventing direct excitation of sonar transducer 30 by the motor controller 42 or the motor 34. It should be noted that at particular frequencies, a typical sonar transducer will exhibit a relatively low impedance. Accordingly, it is even more preferable to "tune" the pulse width modulation frequency to a particular transducer, or select a transducer for a particular pulse width modulation frequency, such that the transducer crystal will exhibit a low impedance at the frequency of the pulse width modulation thereby effectively shunting any signal induced into the received sonar signal by the motor circuit.

It will be further apparent to one skilled in the art that, except as to frequency as discussed hereinbefore, operation of the motor controller is not a part of the present invention. Accordingly, the discussion of the motor controller in reference to the preferred embodiment is given only by way of example and not limitation.

Referring next to FIG. 4, interconnection between the various components is constrained to a large degree by the existing interface to the sonar control unit 28. Typically, the sonar control unit 28 will receive power from the boat's primary electrical system. Therefore, the signal from the sonar transducer 30 will ultimately be referenced to chassis ground of the boat. It should also be noted that in a typical configuration, one lead connected to transducer 30 is also connected to circuit ground within control unit 28 and thus, conductor 44b of cable 32 connects the transducer 30 to circuit ground at sonar control unit 28. The other conductors of cable 32 are preferably connected as follows: twisted pair conductor 44a provides the signal path to and from transducer 30; inner shield 48 is connected to the negative lead 100 of the boat's electrical power supply 102 at sonar control unit 28 (circuit ground) and preferably to shield 40 (FIGS. 2, 3, and 4) over transducer 30 at motor housing 14 (FIGS. 2, 3, and 4); and preferably, outer shield 50 is connects to the negative power supply lead 104 of the trolling motor power supply 106 at control head 26. Optionally, conductor 44b is also connected to inner shield 48 at both control unit 28 and at transducer 30.

It should be noted that it is common in the art to switch the negative side of the trolling motor with motor driver 66 (FIG. 4). In addition, reversing relay 60 reverses the polarity of the conductors which supply power to the motor. As a result, when trolling motor 10 is connected to a battery independent of the boat's electrical system, there is not a chassis ground, as such, connected to the motor. In fact, there may not be a continuous connection of the negative lead 104 of the trolling motor power supply 106 to the motor 34 or the chassis. Optionally the support column 16 may be connected to the negative power supply lead 104 of trolling motor battery 106 thereby providing a chassis ground relative to the trolling motor power supply 106.

Preferably, the trolling motor controller 42 derives its primary power from an external battery independent of the electrical system of the boat. Hence, a fisherman will not have to worry about retaining sufficient charge in the boat's battery to restart the boat's engine. If the external components of the trolling motor are not connected to the negative power supply of the battery, inner shield 48 comprises a single ground point between the two electrical systems at the transducer shield 40. On the other hand, if support column 16 is connected to the negative power supply lead for the trolling motor 10, there will exist the potential for two common ground connections between the two electrical systems, the second one being through the support components of the trolling motor. While such a connection may result in some unwanted electrical current flowing through inner shield 48, since motor 34 does not draw power through a chassis ground, no trolling motor currents will flow through inner shield 48 or conductor 44b and therefore, the impact on the received sonar signal will be minimal.

As will be understood by those skilled in the art, although the above preferred embodiment of the inventive apparatus has been discussed in regard two independent electrical systems, the inventive apparatus would perform acceptably when operated from a single power supply common to both the trolling motor 10 and sonar control unit 28.

It should be noted that while it may be possible to obtain an acceptable signal to noise ratio with either the cable disclosed herein or appropriate matching of the pulse width modulation frequency and the transducer, preferably a trolling motor constructed in accordance with the present invention would incorporate both the cable and matching of the pulse width modulation frequency and the sonar transducer.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A trolling motor comprising
   a submerged motor housing;
   a sonar transducer housed in said motor housing, said transducer having a transducer output; and
   an electrical cable connected to said transducer output comprising:
      a pair of conductors connected to said transducer output, said pair of conductors twisted about each other;
      an inner conductive shield surrounding said pair of conductors;
      a dielectric jacket surrounding said inner conductive shield; and
      an outer conductive shield surrounding said jacket.

2. The trolling motor of claim 1 further comprising:
   a motor housed in said motor housing; and
   a motor controller having a pulse width modulated output to provide electrical power to said motor,
   wherein said sonar transducer has a resonant frequency, and said pulse width modulated output operates at an output frequency, and
   wherein said resonant frequency is not a harmonic of said output frequency.

3. The trolling motor of claim 2 wherein said sonar transducer will exhibit a low impedance at a shunting frequency and wherein said shunting frequency is a harmonic of said output frequency.

4. A trolling motor comprising:
   a submerged motor housing;
   a motor housed in said motor housing;
   a sonar transducer housed in said motor housing, and having a transducer output said transducer having a resonant frequency; an electrical cable connected to said transducer output, wherein said cable includes an inner conductive shield surrounding a twisted pair of conductors, a dielectric jacket surrounding said inner conductive shield, and an outer conductive shield surrounding said dielectric jacket and
   a motor controller having a pulse width modulated output to provide electrical power to said motor, said output operating at an operating frequency, wherein said resonant frequency is not a harmonic of said operating frequency.

* * * * *